United States Patent
Bender et al.

(10) Patent No.: US 10,957,215 B2
(45) Date of Patent: Mar. 23, 2021

(54) ANALYZING DRIVER PATTERN DEVIATIONS FOR TRAINING

(71) Applicant: INTERNATIONAL BUSINESS MACHINES CORPORATION, Armonk, NY (US)

(72) Inventors: Michael Bender, Rye Brook, NY (US); Gregory J. Boss, Saginaw, MI (US); John E. Moore, Jr., Pflugerville, TX (US); Stephen J. McConnell, Northern Ireland (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 375 days.

(21) Appl. No.: 15/868,231

(22) Filed: Jan. 11, 2018

(65) Prior Publication Data
US 2019/0213902 A1    Jul. 11, 2019

(51) Int. Cl.
| G09B 9/052 | (2006.01) |
| B60W 40/09 | (2012.01) |
| G09B 9/05 | (2006.01) |
| G09B 19/16 | (2006.01) |
| G07C 5/00 | (2006.01) |

(52) U.S. Cl.
CPC ............ G09B 9/052 (2013.01); B60W 40/09 (2013.01); G07C 5/008 (2013.01); G09B 9/05 (2013.01); G09B 19/167 (2013.01); *B60W 2420/42* (2013.01)

(58) Field of Classification Search
None
See application file for complete search history.

(56) References Cited

U.S. PATENT DOCUMENTS

| 4,500,868 A | 2/1985 | Tokitsu et al. |
| 5,270,708 A | 12/1993 | Kamishima |
| 7,389,178 B2 | 6/2008 | Raz et al. |
| 7,424,414 B2 | 9/2008 | Craft |
| 8,915,738 B2 | 12/2014 | Mannino |
| 9,478,150 B1 * | 10/2016 | Fields .................. G09B 19/167 |
| 2002/0198632 A1 * | 12/2002 | Breed .................... G08G 1/164 701/1 |
| 2004/0252027 A1 * | 12/2004 | Torkkola ............... G08B 21/06 340/576 |

(Continued)

OTHER PUBLICATIONS

Boyette, "Chevy Malibu reports back to parents on teens' driving", CNN, http://www.cnn.com/2015/09/10/health/chevy-malibu-teen-driver-report-card, Sep. 10, 2015, 3 pages.

(Continued)

*Primary Examiner* — Paul A D'Agostino
(74) *Attorney, Agent, or Firm* — Jay Wahlquist; Andrew D. Wright; Roberts Calderon Safran & Cole, P.C.

(57) ABSTRACT

Approaches for analyzing driver pattern deviations and reproducing the pattern deviations in a user interface or a driving simulator are provided. A computer-implemented method includes: collecting, by a server, data from plural vehicles; determining, by a server, a baseline for a driving action based on the data from the plural vehicles; identifying, by the server, a problem action for a driver based on the baseline; and generating, by the server, an interface to display the problem action.

17 Claims, 4 Drawing Sheets

(56) References Cited

U.S. PATENT DOCUMENTS

| | | | | |
|---|---|---|---|---|
| 2005/0014561 A1* | 1/2005 | Ouchi | ............... | A63F 13/285 |
| | | | | 463/36 |
| 2005/0171663 A1* | 8/2005 | Mittelsteadt | ........... | G07C 5/008 |
| | | | | 701/32.6 |
| 2007/0219675 A1* | 9/2007 | Uchida | ............... | B60W 10/04 |
| | | | | 701/1 |
| 2008/0252412 A1* | 10/2008 | Larsson | ............... | B60R 25/252 |
| | | | | 340/5.2 |
| 2014/0287381 A1* | 9/2014 | Best | ................ | G09B 9/05 |
| | | | | 434/65 |
| 2014/0365070 A1* | 12/2014 | Yano | ............... | G07C 5/0808 |
| | | | | 701/33.4 |
| 2016/0368417 A1* | 12/2016 | Bassi | ............... | H04N 9/09 |
| 2019/0228118 A1* | 7/2019 | Hummelshoj | ......... | G06N 20/00 |

OTHER PUBLICATIONS

MOTOsafety GPS Monitoring for Senior Drivers, http://www.motosafety.com/details-pricing/motosafety-for-seniors/, accessed Nov. 27, 2017, 5 pages.

Weinberg et al., "Developing a Low-Cost Driving Simulator for the Evaluation of In-Vehicle Technologie", http://www.auto-ui.org/09/docs/p51-weinberg.pdf, Proceedings of the First International Conference on Automotive User Interfaces and Interactive Vehicular Applications, Sep. 21-22, 2009, 4 pages.

Automatic, https://Automatic.com, accessed Nov. 27, 2017, 8 pages.

\* cited by examiner

ANALYZING DRIVER PATTERN DEVIATIONS FOR TRAINING

BACKGROUND

The present invention relates generally to driver training and, more particularly, to analyzing driver pattern deviations and reproducing the pattern deviations in a user interface or a driving simulator.

Different drivers have different levels of skill. At times, almost all drivers perform a driving action that they feel could have been performed better. Some driver monitoring systems send an alert to a user, who is not in a vehicle, when certain actions occur while the vehicle is being driven. For example, one system sends an alert to user when the vehicle goes over a designated speed or one of plural safety systems (e.g., antilock brakes) is activated. Another system analyzes driving data and assigns a daily score to driving habits, and shows the number of speeding, acceleration, and harsh braking events that occurred while a vehicle was being driven.

SUMMARY

In a first aspect of the invention, there is a computer-implemented method comprising: collecting, by a server, data from plural vehicles; determining, by the server, a baseline for a driving action based on the data from the plural vehicles; identifying, by the server, a problem action for a driver based on the baseline; and generating, by the server, an interface to display the problem action.

In another aspect of the invention, there is a computer program product for driving analysis. The computer program product comprises a computer readable storage medium having program instructions embodied therewith, the program instructions executable by a computing device to cause the computing device to: collect data from plural vehicles, the data from each of the plural vehicles including camera data, sensor data, a vehicle identifier, and a driver identification; determine respective baselines for plural different driving actions based on the data from the plural vehicles; for each one of plural drivers, compare driving data associated with the driver to each of the baselines; identify a problem action for one of the plural drivers based on the comparing; and generate an interface to display the problem action to the one of the plural drivers.

In another aspect of the invention, there is a system comprising a server located remotely from plural vehicles and configured to collect data from each of the plural vehicles via wireless communication through a network. The server is configured to: determine respective baselines for plural different driving actions based on the data from the plural vehicles; for each one of plural drivers, compare driving data associated with the driver to each of the baselines; identify a problem action for one of the plural drivers based on the comparing; and generate an interface to display the problem action to the one of the plural drivers.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
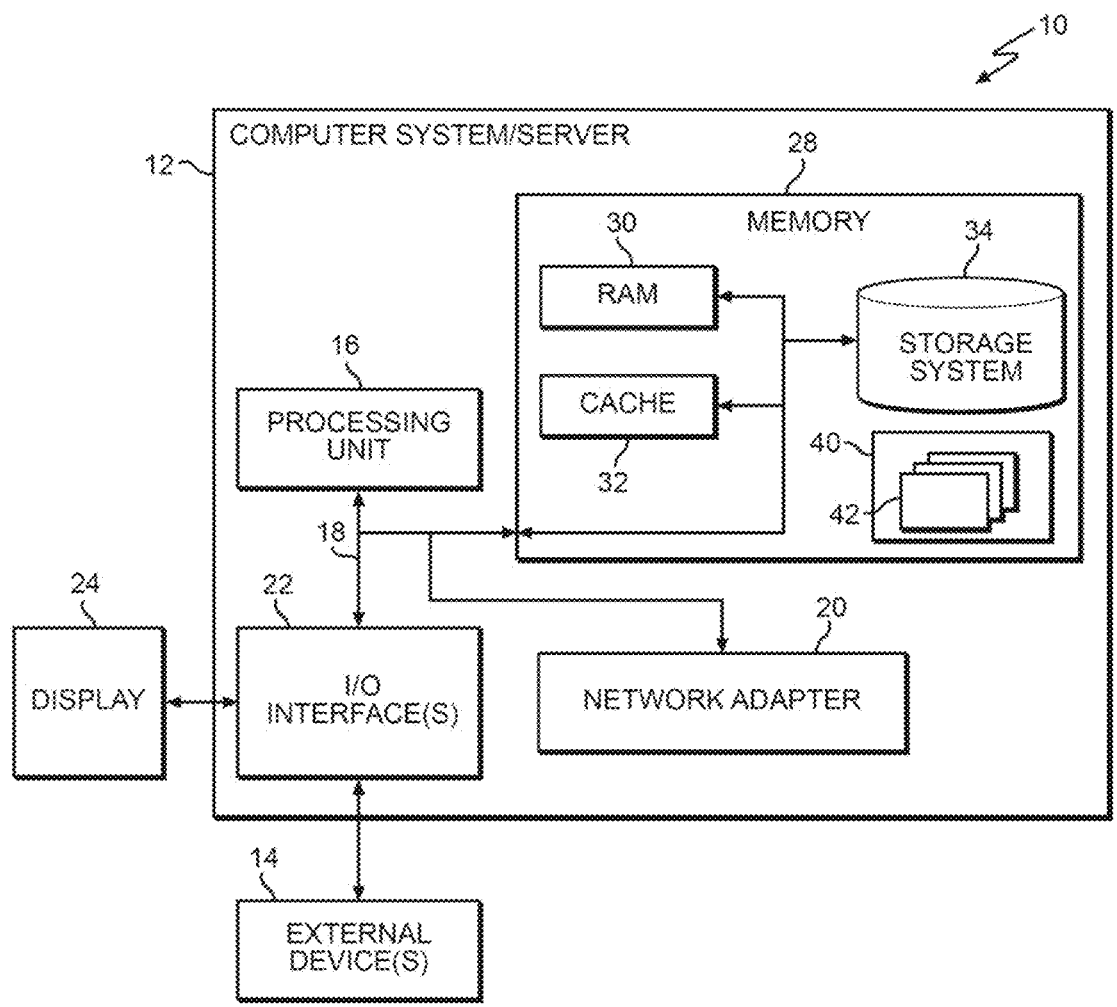
FIG. 1 depicts a computing infrastructure according to an embodiment of the present invention.

The present invention relates generally to driver training and, more particularly, to analyzing driver pattern deviations and reproducing the pattern deviations in a user interface or a driving simulator. Aspects of the invention are directed to detecting a user's driving actions (e.g., driving maneuvers, driving reactions, etc.) and comparing the user's driving actions to a baseline determined from analysis of driving actions of plural other users. In embodiments, in response to determining that a user's driving actions deviate from the baseline by a predefined amount (e.g., a predefined number of standard deviations), the system visually presents the user's driving actions in one or more computer-based driver training programs for this particular user. In accordance with additional aspects of the invention, the system may determine driving conditions that coincide with the detected driving actions, and store data defining the driving conditions linked with the detected driving actions. In this manner, aspects of the invention permit identifying driving actions that deviate sufficiently from normal driving behavior (e.g., the baseline), and the driving conditions that were in place at the time of the identified driving actions, so that the user's driving skill can be assessed and training can be administered in a stress-free environment.

As described herein, implementations of the invention may include: collecting vehicle camera data and vehicle sensor data from plural different vehicles of plural different users, the data defining driving actions; determining a baseline for different driving actions based on the data from the plural different vehicles of the plural different users; comparing the driving actions of a single user to the determined baselines and identifying driving actions in which the user deviates from a baseline by a predefined number of standard deviations; and generating a user interface that displays a visual representation of the identified actions (generated using the vehicle camera data and vehicle sensor data from the user) compared to a visual representation of the baseline (generated using the vehicle camera data and vehicle sensor data from the plural other users). The user interface may be displayed via a desktop computer, laptop computer, tablet computer, smartphone, etc. Additionally, or alternatively, the user interface may be displayed via a special-purpose computer device such as a driving simulator. In this manner, implementations of the invention permit a user to review video data of their driving action compared to video data of a baseline of the same driving action determined from plural other drivers. Advantageously, the review takes place at a location away from the vehicle (e.g., at a computer terminal or driving simulator), which leads to reduced stress, reduced anxiety, and increased comprehension for the user (e.g., compared to a training situation in which the user is being critiqued while driving).

In an aspect of the invention, there is a driving improvement method comprising the steps of: monitoring all driver activities at a pre-specified location; computing an average driver activity from said monitored activities; comparing said activity of one of said drivers to said average driver activity; and recommending driver training for said one of said drivers for those activities which differ more than a pre-specified amount from said average driver activity.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
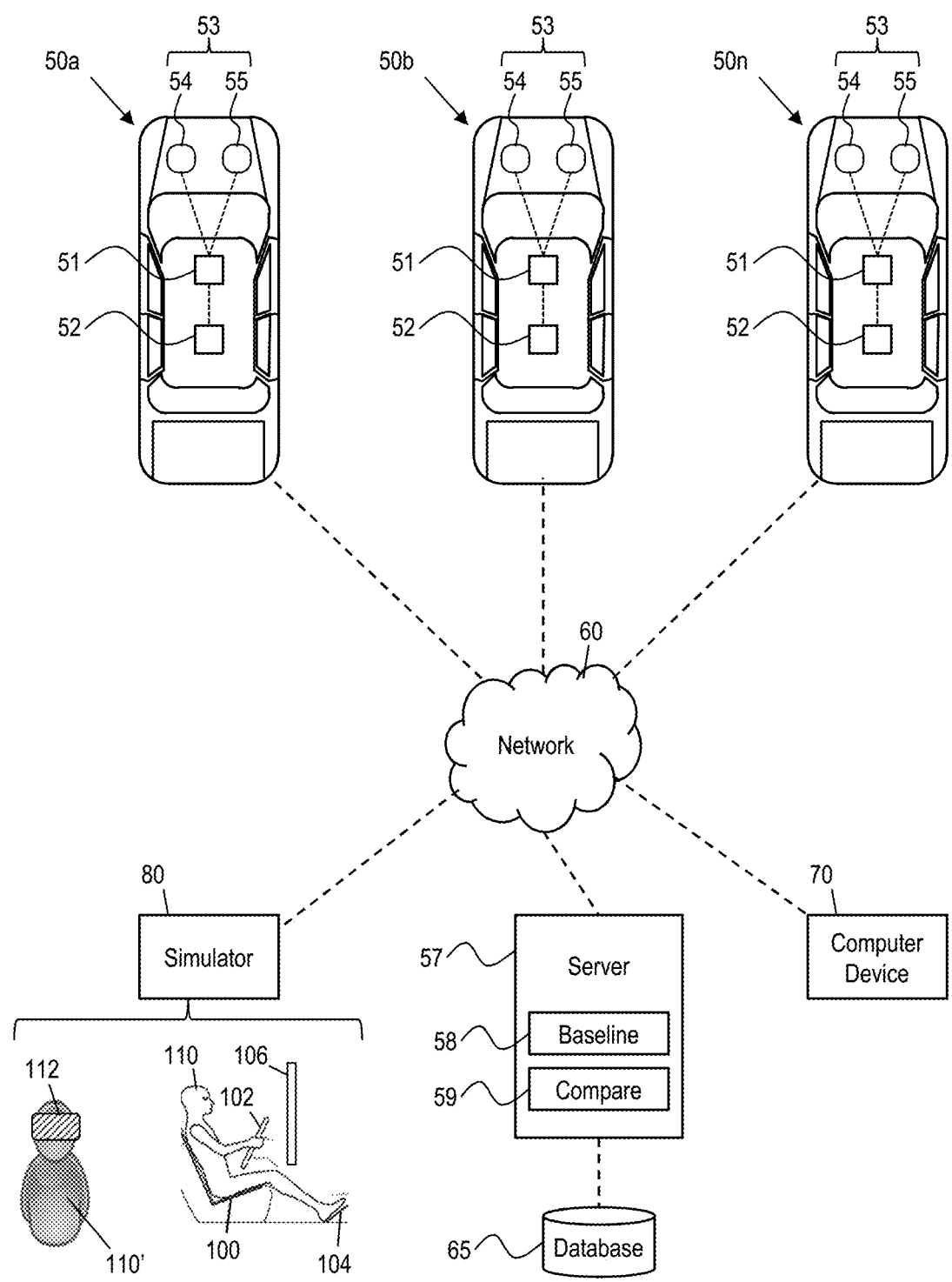
FIG. 2 shows a block diagram of an exemplary environment in accordance with aspects of the invention.

FIG. 2 shows a block diagram of an embodiment of a system in accordance with aspects of the invention. The system includes plural vehicles 50a-n where "n" may represent any number of vehicles, preferably in the hundreds or thousands. In embodiments, each vehicle 50a-n is configured to collect data about the driving actions that occur during use of the vehicle, and to communicate the data to a central server 57 via a network 60. According to aspects of the invention, the server 57 collects data from plural ones of the vehicles, stores that data (e.g., in a database 65), determines baselines for respective driving actions based on the data from plural ones of the vehicles, and compares the data of a single one of the vehicles to the determined baselines to identify problem actions for the driver of the single one of the vehicles. In embodiments, based on identifying problem actions for a driver, the server 57 is configured to generate an interface at a computer device 70 to visually illustrate the identified problem actions. The server 57 may also be configured to output data to a driving simulator 80 to permit the driver to re-enact and practice the identified problem actions. In general, these functions may be conceptually grouped into steps comprising: collecting data from the vehicles; identifying problem actions for a driver; providing an interface to review identified problem actions; and running a driving simulator based on the identified problem actions.

Still referring to FIG. 2, in embodiments each vehicle 55a-n is equipped with an onboard computer 51, a communication system 52, and a data collection system 53. The onboard computer 51 may comprise one or more elements of the computer system 12 of FIG. 1 including, without limitation, a memory that stores one or more programming modules that are executed by a processing unit to perform one or more of the functions described herein. The onboard computer 51 may be integrated with the vehicle, may be an add-on part of the vehicle, or may be a separate device that is carried on or in the vehicle.

The communication system 52 may include an antenna that is operatively connected to the onboard computer 51 and that is configured for radio communication between the vehicle and other computer devices via the network 60. The communication system 52 may comprise a single antenna or plural antennae, and may be configured for any suitable radio communication protocol including but not limited to at least one of Bluetooth, WiFi, and cellular (e.g., GSM, CDMA, TDMA, EVDO, UMTS, HSPA+, etc.).

In embodiments, the data collection system 53 comprises plural sensors that are operatively connected to the onboard computer 51 and that are configured to collect data about driving conditions and actions that occur while a person is driving the vehicle. In embodiments, the sensors of the data collection system 53 include cameras 54 and other sensors 55, which may include any one or more of: vehicle speed sensors; vehicle acceleration sensors; vehicle deceleration sensors; vehicle braking sensors; vehicle proximity sensors; vehicle lane position sensors; steering wheel position sensors; throttle position sensors; ambient/atmospheric light sensors; vehicle location sensors (e.g., GPS); and driver identification sensors (described herein). The data collection system 53 may comprise any desired number of any desired type of sensors to collect data that is used by the server 57 to perform one or more of the functions described herein. The data collection system 53 may also be configured to determine weather conditions (e.g., clear, rain, fog, snow) while the vehicle is being driven, e.g., by contacting a weather reporting service via the network 60.

In embodiments, the cameras 54 on a particular vehicle are configured to capture images of the driving environment as the vehicle is being driven. The images may be used to determine a position of the vehicle on the roadway, e.g., relative to lane markers, curbs, shoulders, medians, stop bars, other vehicles, etc. The cameras 54 may comprise any conventional or later developed type of camera that is configured to capture digital images of an area around the vehicle. In an exemplary embodiment, the cameras 54 are digital cameras that include: a backup camera having a wide-angle field of view outward from the rear of the vehicle; a front camera, such as a dashboard camera, having a wide-angle field of view outward from the front of the vehicle; and left and right side cameras, for example mounted on a left and right side mirrors of the vehicle and having a wide-angle field of view downward from the side mirror. Implementations of the invention are not limited to this example, however, and any number of cameras 54 may be used at any desired locations on the vehicle.

In accordance with aspects of the invention, data from the data collection system 53 (including the one or more cameras and the one or more other sensors) may be analyzed to determine driving actions including at least one of: swerving; smoothness of turns; speed; speed in turns; acceleration; and harsh braking. Data from the data collection system 53 may also be analyzed to categorize driving actions that occur while driving the vehicle, including for example: straight driving; left turn; right turn; and braking.

In embodiments, the data collection system 53 and/or the onboard computer 51 saves a timestamp, based on a clock, with each item of data (data point) that is collected by the cameras 54 and other sensors 55. In this manner, different data may be coordinated in time (using the respective timestamps) during subsequent analysis and/or replay.

With continued reference to FIG. 2, in embodiments the onboard computer 51 of each vehicle 55a-n is configured to identify the driver of the vehicle. This may be performed using conventional techniques, including but not limited to: detecting a key fob with an RFID tag that is unique to each driver; using facial recognition; using fingerprint recognition; etc. According to aspects of the invention, the driver identification can be used to link determined problem actions to drivers instead of vehicles.

According to aspects of the invention, the onboard computer 51 of each respective vehicle 55a-n transmits data collected by the data collection system 53 of the respective vehicle to the server 57. The onboard computer 51 also transmits an identifier of the respective vehicle (e.g., a vehicle identification number (VIN)) and an identifier of the driver of the respective vehicle. In this manner, the server 57 collects driving data from plural different vehicles for plural different drivers. In embodiments, the server 57 stores the collected data in a database 65 for subsequent use.

Still referring to FIG. 2, the server 57 may comprise one or more servers each including a computer system such as computer system 12 of FIG. 1. In embodiments, the server 57 comprises a baseline module 58 and a compare module 59, each of which may comprise a program module such as program module 42 described with respect to FIG. 1. In implementations, the server 57 may include additional or fewer modules than those shown in FIG. 2. For example, separate modules may be integrated into a single computing component or module. Additionally, or alternatively, a single module may be implemented as multiple computing components or modules.

In accordance with aspects of the invention, the baseline module 58 is configured to (e.g., programmed to) analyze the data collected from the plural different vehicles 50a-n, in order to determine a baseline (or optimal) driving behavior for different types of driving actions. In an embodiment, the baseline is an optimal position of a vehicle on a roadway when the vehicle is performing a particular driving action, the optimal position being determined by analyzing the data collected from plural ones of the vehicles 55a-n performing the same driving action. In another embodiment, the baseline is an optimal path of a vehicle along a roadway when the vehicle is performing a particular driving action, the optimal position being determined by analyzing the data collected from plural ones of the vehicles 55a-n performing the same driving action. Implementations of the invention are not limited to these two examples, and other types of baselines may be determined from the data collected from plural ones of the vehicles 50a-n.

Different baselines may be determined for different categories of driving action, e.g., straight driving, left turn, right turn, braking, etc. Different baselines may be determined for different degrees of action within a same category, e.g., 80° left hand turn, 90° left hand turn, 180° left hand turn, etc. Different baselines may be determined for different locations of driving activities, e.g., left hand turn from shared center lane, left hand turn from dedicated left hand turn lane with curb, left hand turn from four-way stop, etc. These examples are for illustration, and it is understood that other categories, degrees, and locations may be used within the scope of the invention.

A baseline in accordance with aspects of the invention may be determined by applying suitable analysis techniques to the data collected from plural ones of the vehicles 50a-n. For example, a baseline may be determined by performing one or more of: image processing of camera data from plural ones of the vehicles 50a-n; image classification of camera data from plural ones of the vehicles 50a-n; and comparing sensor data from plural ones of the vehicles 55a-n to predefined values (e.g., thresholds, ranges, lookup tables) that indicate respective actions. Implementations of the invention are not limited to these examples, and other types of analysis techniques may be used to determine a baseline in accordance with aspects of the invention.

In a particular embodiment, for each respective vehicle 50a-n, the baseline module 58 may be configured to analyze the data from the data collection system 53 (including the one or more cameras and the one or more other sensors) to determine and categorize driving actions that are performed by that vehicle. This analysis may include utilizing data analysis techniques such as image processing, image classification, and comparing sensor data to predefined values to determine: a category of a driving action being performed by the vehicle, and a location of the vehicle relative to the roadway (e.g., relative to an object on the roadway or a portion of the roadway such as lane markers (lines), a curb, a median, a shoulder, a stopbar, a crosswalk, etc.) during the performance of the driving action.

After determining and categorizing the driving actions of each respective vehicle, the baseline module 58 may be configured to determine baselines for each of the respective driving actions. In embodiments, the baseline for a particular driving action is determined from the data of plural different drivers (from plural different vehicles) performing that driving action. For example, the baseline module 58 may be configured to determine a baseline for a 90° left hand turn made from a shared center lane at night, by analyzing the camera data for all the vehicles that made such a driving action. In this example, the baseline may comprise a determined optimal position of a vehicle making a 90° left hand turn made from a shared center lane at night. The optimal positon may be defined relative to an object on the roadway or a portion of the roadway, for example lane markers (lines), a curb, a median, a shoulder, a stopbar, a crosswalk, etc. The optimal position may be determined by analyzing the data of all vehicles that performed this driving action, e.g., by determining an average positon of all such vehicles (relative to an object on the roadway or a portion of the roadway) when performing this driving action. Other numerical methods may be used in determining the optimal position. For example, rather than determining the optimal position based on an average positon of all the vehicles that performed the same driving action, the baseline module 58 may be configured to determine an average positon of a subset of all the vehicles performing this driving action. The subset may be selected in any desired manner, including, for example, using clustering methods.

In this manner, the baseline module 58 may use the data collected from plural vehicles 55a-n to determine a baseline driving behavior (e.g., optimal position or path) of a vehicle on a roadway when the vehicle is performing a particular driving action. Different baselines may be determined (e.g., based on analyzing the data collected from plural vehicles 50a-n) for different driving actions. The server 57 may store data defining each determined baseline in the database 65. The server 57 may be configured to update an already determined baseline using new data is collected from one or more of the plural vehicles 50a-n, e.g., by re-determining the baseline using both the old data and the new data. In this manner, the server 57 may update a baseline as new data is collected from one or more of the vehicles 50a-n.

With continued to FIG. 2, according to aspects of the invention, the compare module 59 is configured to (e.g., programmed to) compare the data collected from a particular one of the vehicles to the baseline(s) in order to determine a problem action for the driver of the particular one of the vehicles. In embodiments, the compare module 59 identifies a potential problem action based on determining that a position of a vehicle on a road (or a path of the vehicle along the road) during a driving action deviates by a predefined amount from the baseline for the same driving action. The predefined amount may be defined in any suitable manner, including as a predefined number of standard deviations from the baseline. The number of standard deviations may be any desired number, including but not limited to 0.5, 1, or 2, for example.

In embodiments, the compare module 59 identifies a problem action for the driver based on determining that a number of potential problem actions exceed a predefined amount. The predefined amount may be defined in any suitable manner, including as a percentage of the number of times the driver has performed the driving action. The percentage may be any desired value, including but not limited to 10%, for example.

The following exemplary use cases illustrate the identification of a problem action for DriverA who drives vehicle 50a and DriverB who drives vehicle 50b. In these examples, the measure of identifying a potential problem action is defined as two standard deviations from the baseline, and the measure for identifying a problem action from a number of potential problem actions is a threshold of 10%. In a first example, for a particular driving action (e.g., performing a 90° left hand turn made from a shared center lane at night), the server 57 determines a 5% occurrence rate of DriverA deviating from the baseline by two standard deviations or more. In this first example, the driving action (e.g., performing a 90° left hand turn made from a shared center lane at night) is not deemed a problem action for DriverA since the 5% occurrence rate is less than the 10% threshold. In a second example, for the same driving action (e.g., performing a 90° left hand turn made from a shared center lane at night), the server 57 determines a 13% occurrence rate of DriverB deviating from the baseline for the driving action by two standard deviations or more. In this second example, the driving action (e.g., performing a 90° left hand turn made from a shared center lane at night) is deemed a problem action for DriverB since the 13% occurrence rate is greater than the 10% threshold.

In this manner, it is understood that implementations of the invention may be used to determine a problem action for a driver by comparing the data collected from that driver's vehicle to baselines that are defined by data collected from plural vehicles. In embodiments, in response to determining a problem action for a driver in this manner, the compare module 59 flags (e.g., tags) the data collected from the vehicle during performance of the problem action. The flags may include metadata and may be based on the timestamps that are saved with the data, as described herein. For example, in the example of DriverB described above, the compare module 59 flags (e.g., tags) data collected from the cameras of vehicle 50b when vehicle 50b is performing a 90° left hand turn made from a shared center lane at night, since this driving action has been identified as a problem action for DriverB.

Still referring to FIG. 2, according to aspects of the invention, the server 57 is configured to generate a user interface for display at the computer device 70, wherein the user interface is generated based on flagged data associated with an identified problem action for a driver. For example, the server 57 may be configured to transmit flagged camera data to the computer device 70 so that the driver can see and review actual images of their identified as a problem action. In the example of DriverB described above, the server 57 transmits flagged camera data collected from the vehicle 50*b* to the computer device 70. The transmitted camera data corresponds to an actual instance of when DriverB performed a 90° left hand turn from a shared center lane at night, which turn deviated from the baseline by more than two standard deviations. By displaying the flagged camera data on the computer device 70, DriverB can see actual imagery of their vehicle when they performed a driving action that deviated from a baseline by a sufficient amount. In this manner, DriverB may review the imagery is a stress-free environment that is more conducive to learning from the identified problem.

In addition to transmitting the flagged data to the computer device 70, the server 57 may also transmit camera data collected from a vehicle that is less than the number of standard deviations from the baseline for the same driving action at the same (or a similar) location. In this manner, the computer device 70 may visually display, in the same interface, the camera data from the driver's vehicle and camera data from another vehicle performing the same driving action. The camera data from the two vehicles may be displayed side-by-side or overlaid with one another, to allow the driver (or a parent or a driving instructor) to see the problem action.

Figure 3:
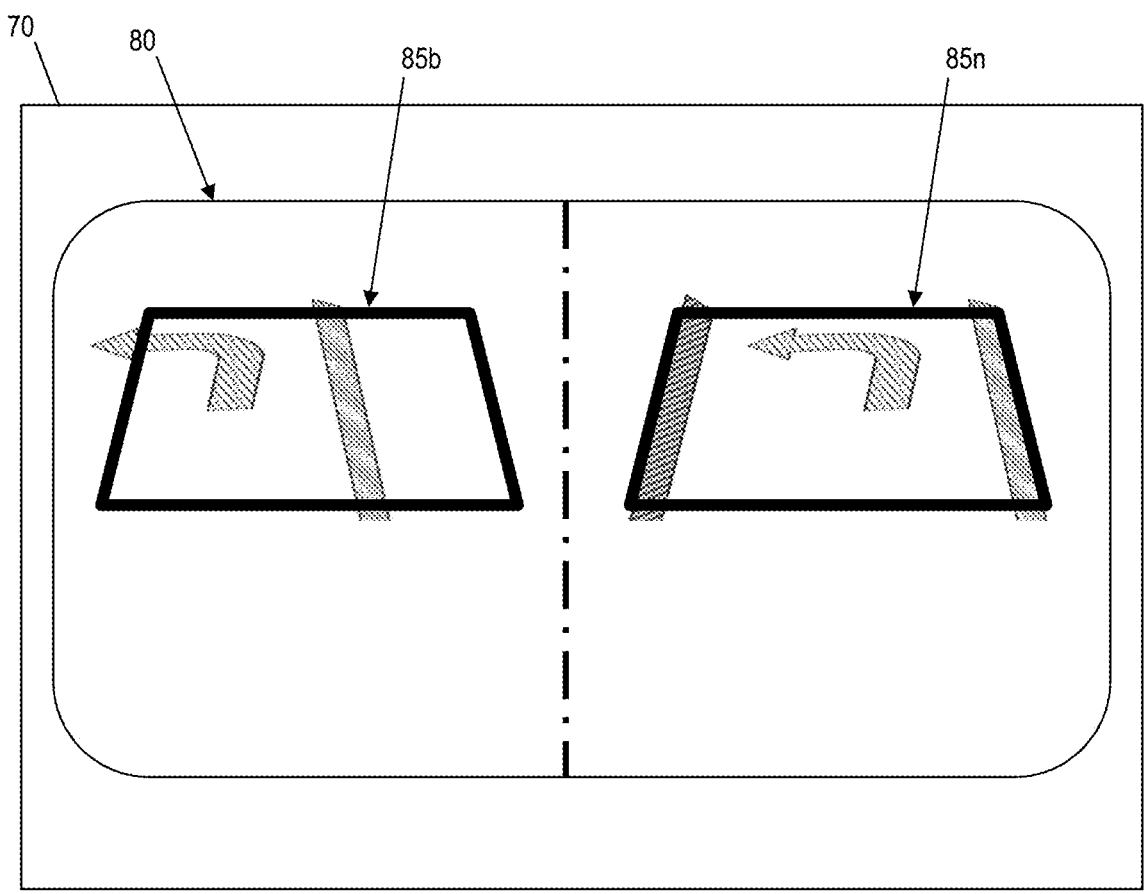
FIG. 3 shows an exemplary interface in accordance with aspects of the invention.

This is illustrated in FIG. 3, which depicts the computer device 70 displaying an interface 80 that includes camera data from vehicle 50*b* (e.g., of DriverB from the example herein) displayed beside camera data from another vehicle 50*n*. In particular, the interface shows actual images 85*b* captured from a dashboard camera of vehicle 50*b*, and actual images 85*n* captured from a dashboard camera of vehicle 50*n*. In the interface, both vehicles 50*b* and 50*n* are performing the same driving action, i.e., the driving action identified as a problem action for DriverB, e.g., a 90° left hand turn from a shared center lane at night. In this manner, the driver (e.g., DriverB) can visually review how their vehicle is positioned compared to another vehicle performing the same driving action, i.e., DriverB can see form the displayed camera data how their vehicle is not centered in the lane, whereas the other vehicle is properly centered in the lane. In this manner, DriverB can learn from the visualization. Implementations of the invention are not limited to the interface arrangement and dashboard camera data shown in FIG. 3. Instead, other interface arrangements may be used, and other types of camera data may be displayed.

Referring back to FIG. 2, in another embodiment the server 57 is configured to generate a user interface for display at a driving simulator 80, wherein the user interface is generated based on flagged data associated with an identified problem action for a driver. For example, the server 57 may be configured to transmit flagged camera data and corresponding data collected from other sensors (e.g., sensors 55) to the driving simulator 80. The server 57 may also be configured to transmit to the driving simulator 80 flagged camera data and corresponding data for other drivers that have been identified as having the same problem action. In this manner, the driving simulator 80 may execute a driving simulation with the driver, which allows the driver to practice the problem action using the driving simulator 80.

In one embodiment, the simulator 80 comprises a driving simulator that includes a seat 100, steering wheel 102, pedals 104, and at least one computer display screen 106. In this embodiment, the simulator 80 displays driving simulation images on the at least one computer display screen 106, and changes what is displayed on the at least one computer display screen 106 in response to inputs provided by the seated user 110 via the steering wheel 102 and pedals 104. According to aspects of the invention, the driving simulation images displayed on the at least one computer display screen 106 comprise, or are derived from, images captured by the cameras 54 of plural ones of the vehicles 50*a*-*n*. In this manner, the user 110 can practice simulated driving actions, using real world images captured by the cameras, in a protected environment.

In another embodiment, the simulator 80 comprises a virtual reality (VR) system comprising a head mounted display (HMD) 112 that a user 110' wears. In this embodiment, the HMD 112 includes a computer display screen that presents driving simulation images to the user 100' wearing the HMD 112, and the HMD 112 changes what is displayed on the computer display screen in response to detected body movements of the user 110'. The detection of body movements and resultant change in display may be performed using conventional VR techniques and hardware. According to aspects of the invention, the driving simulation images displayed via HMD 112 comprise, or are derived from, images captured by the cameras 54 of plural ones of the vehicles 50*a*-*n*. In this manner, the user 110' can practice simulated driving actions, using real world images captured by the cameras, in a protected environment.

Figure 4:
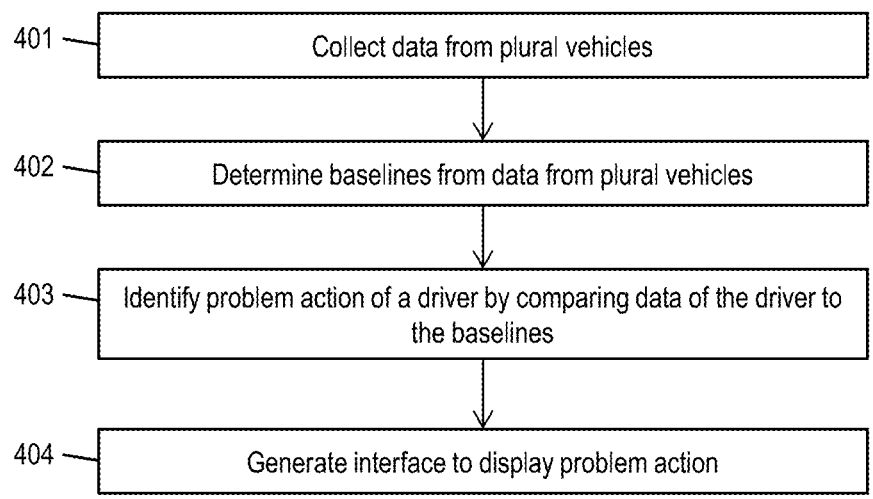
FIG. 4 shows a flowchart of a method in accordance with aspects of the invention.

FIG. 4 shows a flowchart of a method in accordance with aspects of the invention. Steps of the method of FIG. 4 may be performed in the system illustrated in FIG. 2 and are described with reference to elements and steps described with respect to FIG. 2.

At step 401, the system collects data from plural vehicles. For example, as described with respect to FIG. 2, plural vehicles 55*a*-*n* each include a data collection system 53 that collects camera data and sensor data. In embodiments, each of the vehicles 55*a*-*n* transmits the collected data to a central server 57. In this manner, the server 57 collects data from plural vehicles. The collected data may also include a vehicle identifier and a driver identification, as described herein.

At step 402, the system determines baselines from the data from step 401. In embodiments, the baseline module 58 determines a baseline for a driving action by analyzing the data from plural ones of the vehicles 50*a*-*n*, e.g., in the manner described with respect to FIG. 2. In embodiments, the system determines a respective baseline in this manner for plural different driving actions, e.g., as described with respect to FIG. 2.

At step 403, the system identifies a problem action of a driver by comparing data of the driver to the baselines from step 402. In embodiments, the compare module 59 compares the data associated with a particular driver to the baselines, e.g., in the manner described with respect to FIG. 2. A potential problem action may be identified based on the data associated with a particular driver deviating from a baseline by more than a predefined amount (e.g., a predefined number of standard deviations). A problem action may be identified when the number of identified potential problem action exceeds a threshold (e.g., a predefined percentage of the occurrences for the particular driving action).

At step 404, the system generates an interface to display the problem action identified at step 403. In an embodiment, the server 57 generates the interface at a computer device 70, e.g., in the manner described with respect to FIGS. 2 and 3.

In another embodiment, the server 57 generates the interface at a driving simulator 80, e.g., in the manner described with respect to FIG. 2.

While aspects of the present invention may track the location of vehicles, such location tracking may occur on an "opt-in" basis in which a user provides explicit permission for the vehicle location to be tracked. Further, location tracking may be implemented in accordance with applicable privacy laws and may be discontinued at any time for users who have revoked permission for location tracking. Additionally, to the extent the aforementioned implementations collect, store, or employ personal information provided by users (e.g., via their vehicle), it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    collecting, by a server, data from plural vehicles;
    determining, by the server, a baseline for a driving action based on the data from the plural vehicles;
    identifying, by the server, a problem action for a driver based on the baseline; and
    generating, by the server, an interface to display the problem action,
    wherein the identifying the problem action for the driver comprises:
        determining a number of times the driver performs the driving action;
        determining a number of potential problem actions for the driving action based on instances of the driving data associated with the driver deviating from the baseline by more than a predefined amount; and
        determining that the number of potential problem actions for the driving action exceeds a predefined percentage of the number of times the driver performs the driving action.

2. The method of claim 1, wherein the data from the plural vehicles comprises camera data and sensor data, wherein the sensor data comprises data obtained from:
    a vehicle speed sensor;
    a vehicle acceleration sensor;
    a vehicle braking sensor;
    a vehicle proximity sensor;
    a vehicle lane position sensor;
    a steering wheel position sensor;
    a throttle position sensor;
    a ambient/atmospheric light sensor;
    a vehicle location sensor; and
    a driver identification sensor.

3. The method of claim 2, wherein the camera data is collected from:
    a backup camera having a wide-angle field of view outward from the rear of the vehicle;
    a dashboard camera having a wide-angle field of view outward from the front of the vehicle; and
    left and right side cameras mounted on a left and right side mirrors of the vehicle and having a wide-angle field of view downward from the respective left and right side mirrors.

4. The method of claim 1, wherein the identifying the problem action comprises comparing driving data associated with the driver to the baseline,
    wherein the baseline is an optimal position of a vehicle on a roadway when the vehicle is performing a particular driving action, the optimal position being determined by analyzing the data from plural vehicles performing the same driving action.

5. The method of claim 4, further comprising determining, based on the comparing, that the driving data associated with the driver deviates from the baseline by more than a predefined amount.

6. The method of claim 1, wherein the generating the interface comprises transmitting driving data associated with the driver to a computer device that is configured to display the interface.

7. The method of claim 1, wherein the interface comprises a visual comparison of driving data associated with the driver to driving data of another driver,
    wherein the visual comparison comprises: camera images captured from a camera in the vehicle of the driver while performing a predefined category of driving action displayed side-by-side or overlaid with camera images captured from a camera in a vehicle of the other driver while performing the same predefined category of driving action.

8. The method of claim 1, wherein the generating the interface comprises transmitting driving data associated with the driver to a driving simulator.

9. The method of claim 1, wherein the server receives a vehicle identifier and a driver identification from each of the plural vehicles.

10. A computer program product for driving analysis, the computer program product comprising a computer readable storage medium having program instructions embodied therewith, the program instructions executable by a computing device to cause the computing device to:
collect data from plural vehicles, the data from each of the plural vehicles including camera data, sensor data, a vehicle identifier, and a driver identification;
determine respective baselines for plural different driving actions based on the data from the plural vehicles;
for each one of plural drivers, compare driving data associated with the driver to each of the baselines;
identify a problem action for one of the plural drivers based on the comparing; and
generate an interface to display the problem action to the one of the plural drivers,
wherein the generating the interface comprises transmitting driving data associated with the one of the plural drivers to a computer device that is configured to display the interface,
wherein the respective baselines include different baselines for respective ones of the plural different actions, the different baselines including:
a baseline while driving straight;
a baseline while turning left;
a baseline while turning right; and
a baseline while braking.

11. The computer program product of claim 10, wherein the identifying the problem action for the one of the plural drivers comprises determining, based on the comparing, that the driving data associated with the one of the plural drivers deviates from one of the baselines by more than a predefined amount,
wherein the one of the baselines is an optimal path of a vehicle along a roadway when the vehicle is performing a particular driving action, the optimal path being determined by analyzing the data from plural vehicles performing the same driving action.

12. The computer program product of claim 10, wherein the interface comprises a visual comparison of the driving data associated with the one of the plural drivers to driving data associated with another one of the plural drivers.

13. The computer program product of claim 10, wherein the generating the interface comprises transmitting driving data associated with the one of the plural drivers to a driving simulator that is configured to display driving simulation images to a seated user and to change the displayed driving simulation images in response to input received from the seated user via a steering wheel and/or a pedal.

14. A system comprising:
a server located remotely from plural vehicles and configured to collect data from each of the plural vehicles via wireless communication through a network, wherein the server is configured to:
determine respective baselines for plural different driving actions based on the data from the plural vehicles;
for each one of plural drivers, compare driving data associated with the driver to each of the baselines;
identify a problem action for one of the plural drivers based on the comparing; and
generate an interface to display the problem action to the one of the plural drivers,
wherein the interface comprises a visual comparison of the driving data associated with the one of the plural drivers to driving data associated with another one of the plural drivers,
wherein the visual comparison comprises: camera images captured from a camera in a vehicle of the one of the plural drivers while performing a predefined category of driving action displayed side-by-side or overlaid with camera images captured from a camera in a vehicle of the other one of the plural drivers while performing the same predefined category of driving action.

15. The system of claim 14, wherein the identifying the problem action for the one of the plural drivers comprises determining, based on the comparing, that the driving data associated with the one of the plural drivers deviates from one of the baselines by more than a predefined amount.

16. The system of claim 14, wherein the generating the interface comprises transmitting driving data associated with the one of the plural drivers to a driving simulator that includes a virtual reality (VR) system comprising a head mounted display (HMD), the VR system being configured to display driving simulation images to a user wearing the HMD, and to change the displayed driving simulation images in response to detected body movements of the user wearing the HMD.

17. The computer program product of claim 10, wherein:
the program instructions cause the computing device to categorize driving actions performed by respective ones of the plural vehicles into one of the plural different driving actions performed at one of plural locations on a roadway;
the plural different driving actions include: driving straight; turning left; turning right; and braking;
the plural locations on the roadway include: a shared center lane; a dedicated left hand turn lane; and a four-way stop; and
the determining the respective baselines comprises determining a different baseline for different combinations of one of the plural different driving actions and one of the plural locations on the roadway.

* * * * *